United States Patent
Michishita (10) Patent No.: US 10,719,412 B2
(45) Date of Patent: Jul. 21, 2020

(54) IMAGE FORMING APPARATUS THAT AUTOMATICALLY EXECUTES SYSTEM ROLLBACK, METHOD OF CONTROLLING THE SAME, AND STORAGE MEDIUM

(71) Applicant: CANON KABUSHIKI KAISHA, Tokyo (JP)

(72) Inventor: Takumi Michishita, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 15/915,173

(22) Filed: Mar. 8, 2018

(65) Prior Publication Data

US 2018/0267864 A1 Sep. 20, 2018

(30) Foreign Application Priority Data

Mar. 17, 2017 (JP) ................................ 2017-052510

(51) Int. Cl.
| | |
|---|---|
| G06F 11/00 | (2006.01) |
| G06F 11/14 | (2006.01) |
| G06F 8/61 | (2018.01) |
| G06F 8/65 | (2018.01) |

(52) U.S. Cl.
CPC ............ *G06F 11/1469* (2013.01); *G06F 8/63* (2013.01); *G06F 8/65* (2013.01); *G06F 11/1433* (2013.01); *G06F 2201/805* (2013.01); *G06F 2201/82* (2013.01)

(58) Field of Classification Search
CPC .... G06F 11/16; G06F 11/2023; G06F 11/004; G06F 11/07; G06F 11/22; G06F 11/00

USPC ........................................................... 714/16
See application file for complete search history.

(56) References Cited

U.S. PATENT DOCUMENTS

| | | | |
|---|---|---|---|
| 9,081,964 B2 | 7/2015 | Liu et al. | |
| 2006/0291876 A1* | 12/2006 | Kawai | G03G 15/55 399/24 |
| 2009/0010670 A1* | 1/2009 | Otsuka | G03G 15/0131 399/75 |
| 2011/0289497 A1* | 11/2011 | Kiaie | G06F 8/65 717/171 |
| 2012/0200868 A1* | 8/2012 | Ikeda | G06K 15/027 358/1.9 |
| 2012/0268791 A1* | 10/2012 | Shibata | G06K 15/4095 358/1.16 |
| 2013/0111459 A1* | 5/2013 | Nakamoto | G06F 8/65 717/172 |
| 2013/0265610 A1* | 10/2013 | Noda | G06K 15/1881 358/3.01 |
| 2013/0268735 A1* | 10/2013 | Gibert Codina | G06F 12/0815 711/141 |

(Continued)

FOREIGN PATENT DOCUMENTS

JP 2014130585 A 7/2014

*Primary Examiner* — Sarai E Butler
(74) *Attorney, Agent, or Firm* — Rossi, Kimms & McDowell LLP (57) ABSTRACT

An image forming apparatus capable of automatically rolling back the system to an appropriate state. The image forming apparatus updates system data set therein. History information of the system data is managed, and execution of rollback processing for replacing the system data by system data which was set before the system data is controlled based on the history information of the system data.

16 Claims, 7 Drawing Sheets

(56) References Cited

U.S. PATENT DOCUMENTS

| | | | |
|---|---|---|---|
| 2014/0007073 A1* | 1/2014 | Cavalaris | G06F 8/654 |
| | | | 717/172 |
| 2015/0143163 A1* | 5/2015 | Dasari | G06F 11/1417 |
| | | | 714/6.3 |
| 2017/0094105 A1* | 3/2017 | Ohkawa | H04N 1/32625 |
| 2017/0141968 A1* | 5/2017 | Lloyd | H04L 41/22 |
| 2017/0344355 A1* | 11/2017 | Sarkar | G06F 8/65 |
| 2018/0293066 A1* | 10/2018 | Ali | G06F 11/302 |

* cited by examiner

| | VERSION (301) | UPDATE DATE (302) | OPERATING TIME PERIOD (HOURS) (303) | NORMAL START-UP (NUMBER OF TIMES) (304) | SCAN COUNT (305) | PRINT COUNT (306) |
|---|---|---|---|---|---|---|
| 1 | V10.02 | 2016/3/1 | 200 | 10 | 2500 | 3500 |
| 2 | V04.01 | 2015/9/1 | 700 | 40 | 8000 | 10000 |
| 3 | V02.01 | 2015/3/31 | 120 | 20 | 250 | 400 |
| 4 | V01.01 | 2015/1/1 (PRODUCTION DATE) | 350 | 30 | 4500 | 6000 |

FIG. 3B

| | DATA NAME (308) | UPDATE DATE (309) | OPERATING TIME PERIOD (HOURS) (310) | PRINT COUNT (311) |
|---|---|---|---|---|
| 1 | /data/adjust/data4 | 2016/3/6 | 200 | 1000 |
| 2 | /data/adjust/data3 | 2015/2/14 | 3500 | 10000 |
| 3 | /data/adjust/data2 | 2015/5/20 | 700 | 6000 |
| 4 | /data/adjust/data1 | 2015/1/1 (PRODUCTION DATE) | 10 | 400 |

FIG. 3C

| | DATA NAME (313) | BACKUP DATE (314) | DATA-UNCHANGED TIME PERIOD (HOURS) (315) | NORMAL START-UP (NUMBER OF TIMES) (316) |
|---|---|---|---|---|
| 1 | /data/user/data6 | 2016/4/1 | 20 | 10 |
| 2 | /data/user/data5 | 2016/1/1 | 1050 | 40 |
| 3 | /data/user/data4 | 2015/10/1 | 450 | 50 |
| 4 | /data/user/data3 | 2015/7/1 | 1200 | 55 |
| 5 | /data/user/data2 | 2015/4/1 | 600 | 60 |
| 6 | /data/user/data1 | 2015/1/1 | 10 | 1 |

FIG. 4

| | | ROLLBACK TRIGGER | ROLLBACK TARGET | | |
|---|---|---|---|---|---|
| 400 | | 401 | 402 | | |
| | | | FIRMWARE | IMAGE ADJUSTMENT DATA | USER SETTINGS DATA |
| 1 | AUTOMATIC | STORAGE DEVICE FAILURE | LATEST VERSION | - | - |
| 2 | | START-UP FAILURE | NORMAL START-UP NOT LESS THAN 30 TIMES | - | NORMAL START-UP NOT LESS THAN 30 TIMES |
| 3 | | DATA INCONSISTENCY | - | - | DATA-UNCHANGED TIME PERIOD NOT SHORTER THAN 10 DAYS |
| 4 | | IMAGE DEFECT | - | PRINT COUNT NOT LESS THAN 4000 | - |
| 5 | | FAULTY SCAN OPERATION | SCAN COUNT NOT LESS THAN 5000 | - | - |
| 6 | | FAULTY PRINT OPERATION | PRINT COUNT NOT LESS THAN 3000 | PRINT COUNT NOT LESS THAN 1000 | - |
| 7 | MANUAL | REQUEST OF IMMEDIATELY PRECEDING FIRMWARE | PRECEDING VERSION | - | - |
| 8 | | REQUEST OF FACTORY SHIPMENT STATE | VERSION AT TIME OF FACTORY PRODUCTION | DATA AT TIME OF FACTORY PRODUCTION | INITIAL STATE |

IMAGE FORMING APPARATUS THAT AUTOMATICALLY EXECUTES SYSTEM ROLLBACK, METHOD OF CONTROLLING THE SAME, AND STORAGE MEDIUM

BACKGROUND OF THE INVENTION

Field of the Invention

The present invention relates to an image forming apparatus that automatically executes system rollback, a method of controlling the same, and a storage medium.

Description of the Related Art

There has been known an MFP as an image forming apparatus which has firmware programs (hereinafter simply referred to as the "firmware") installed therein in advance, for executing processing operations, such as print processing. When a new version of the firmware is provided, the MFP acquires update data including the new version of firmware e.g. from a distribution server via the Internet according to a user's operation. The MFP updates the firmware of the MFP based on the acquired update data. Further, the MFP holds a plurality of settings data items used for print processing and the like. The settings data refers to, for example, image adjustment data for properly correcting gradation, density, and so forth, of an image, and user settings data including custom setting values specific to each user, which are set to improve user operability. In the MFP, the image adjustment data is adjusted to proper values according to a change in the operating environment or the like of the MFP, and further, the user settings data is changed to new user settings data according to a user's instruction. That is, in the MFP, system data, such as firmware installed e.g. during factory production in advance, and settings data, is updated on an as-needed basis.

By the way, in the MFP, after updating the system data, the system of the MFP sometimes fails to normally operate e.g. due to a malfunction of updated firmware or incompatibility of the same with internal devices or settings data of the MFP. In this case, to recover the system from the failure, rollback processing for rolling back the system of the MFP to an appropriate state before occurrence of the system failure is performed by the MFP. For example, after updating the firmware, the MFP executes a self-test for determining whether or not the MFP can normally operate, and if it is determined that the MFP cannot normally operate, the MFP automatically rolls back the firmware to the firmware before the update, with which the MFP normally operated (see e.g. Japanese Laid-Open Patent Publication (Kokai) No. 2014-130585). This makes it possible to easily roll back the system of the MFP to an appropriate state before occurrence of the system failure without taking the time and effort of the user.

However, in the above-described technique disclosed in Japanese Laid-Open Patent Publication (Kokai) No. 2014-130585, in a case where the system of the MFP ceases to normally operate at a time other than the update of the firmware, it is impossible to automatically roll back the system of the MFP to an appropriate state.

SUMMARY OF THE INVENTION

The present invention provides an image forming apparatus that is capable of automatically rolling back the system to an appropriate state, a method of controlling the same, and a storage medium.

In a first aspect of the present invention, there is provided an image forming apparatus that updates system data set therein, comprising a management unit configured to manage history information of the system data, and a rollback control unit configured to control execution of rollback processing for replacing the system data by system data which was set before the system data, based on the history information of the system data.

In a second aspect of the present invention, there is provided a method of controlling an image forming apparatus that updates system data set therein, comprising managing history information of the system data, and controlling execution of rollback processing for replacing the system data by system data which was set before the system data, based on the history information of the system data.

In a third aspect of the present invention, there is provided a non-transitory computer-readable storage medium storing a computer-executable program for executing a method of controlling an image forming apparatus that updates system data set therein, wherein the method comprises managing history information of the system data, and controlling execution of rollback processing for replacing the system data by system data which was set before the system data, based on the history information of the system data.

According to the present invention, it is possible to automatically roll back the system of the image forming apparatus to an appropriate state.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
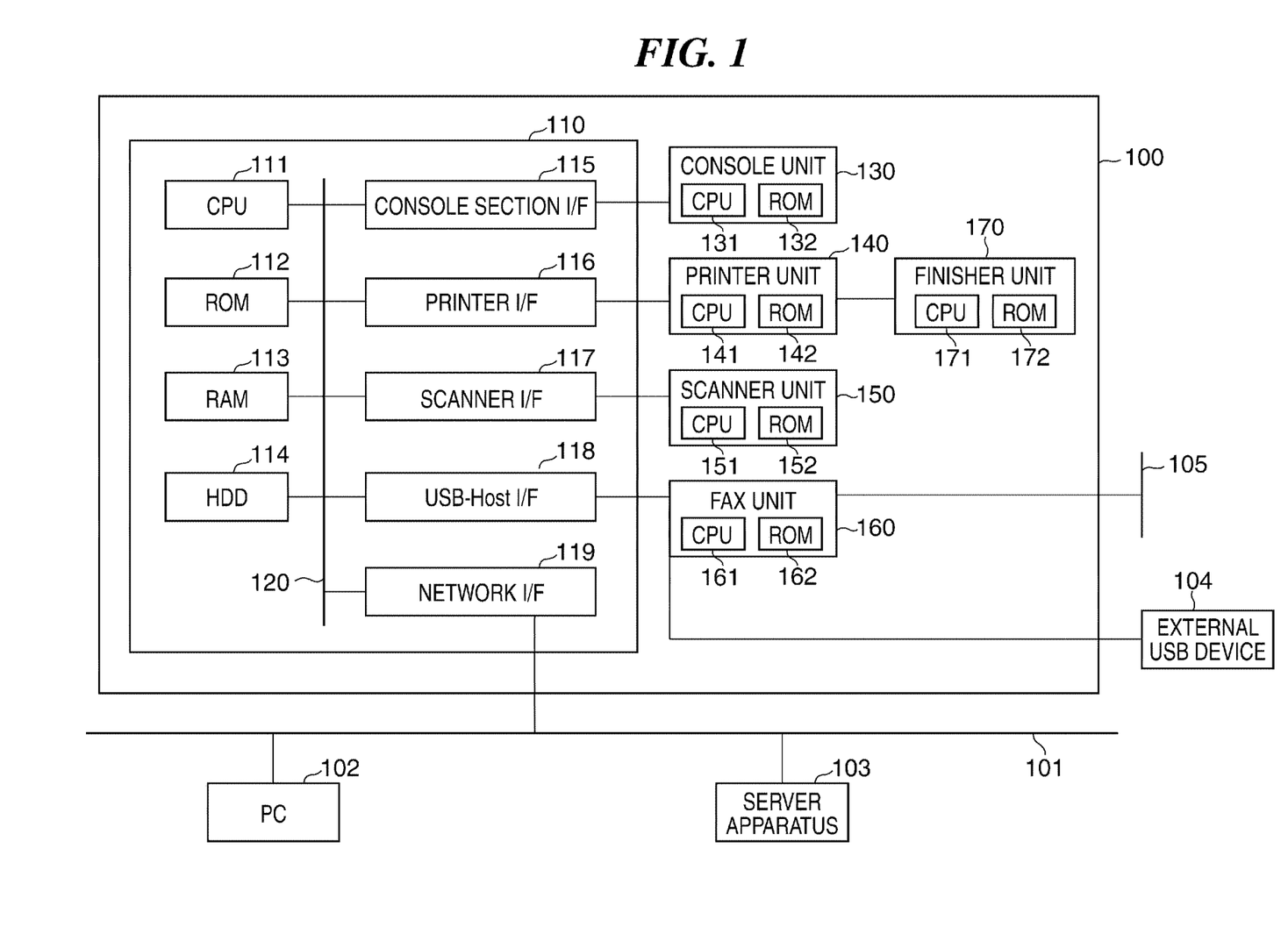
FIG. 1 is a schematic block diagram of an MFP as an image forming apparatus according to an embodiment of the present invention.

FIG. 1 is a schematic block diagram of an MFP 100 as an image forming apparatus according to an embodiment of the present invention.

Referring to FIG. 1, the MFP 100 includes a main controller 110, a console unit 130, a printer unit 140, a scanner unit 150, a FAX unit 160, and a finisher unit 170. The main controller 110 is connected to the console unit 130, the printer unit 140, the scanner unit 150, and the FAX unit 160, and the finisher unit 170 is connected to the printer unit 140. The main controller 110 includes a CPU 111, a ROM 112, a RAM 113, an HDD 114, a console section interface 115, a printer interface 116, a scanner interface 117, a USB-host interface 118, and a network interface 119. The CPU 111, the ROM 112, the RAM 113, the HDD 114, the console section interface 115, the printer interface 116, the scanner interface 117, the USB-host interface 118, and the network interface 119 are interconnected via a system bus 120.

The main controller 110 controls the overall operation of the MFP 100. The CPU 111 executes firmware stored in the ROM 112 to thereby control the component elements of the main controller 110. The ROM 112 stores the firmware including programs for executing processing operations of a main system module 200, described hereinafter with reference to FIG. 2, version information of the firmware, device configuration information of the MFP, and so forth. The RAM 113 is used as a work area for the CPU 111, and an area for temporarily storing various data. The HDD 114 stores print data acquired e.g. from a PC 102 via the network interface 119, image data generated by the scanner unit 150, and so forth. The console section interface 115 outputs information which is input by a user's operation on the console unit 130 to the CPU 111. Further, the console section interface 115 outputs a display control signal sent from the CPU 111 to the console unit 130 to thereby control the display on the console unit 130.

The printer interface 116 performs data communication with the printer unit 140, and for example, the printer interface 116 outputs print data to the printer unit 140. The scanner interface 117 performs data communication with the scanner unit 150, and for example, the scanner interface 117 acquires image data generated by the scanner unit 150, and stores the acquired image data in the HDD 114. The USB-host interface 118 performs data communication with the FAX unit 160, and for example, the USB-host interface 118 transmits image data stored in the HDD 114 to the FAX unit 160. Further, the USB-host interface 118 can be connected to an external USB device 104, such as a USB memory and a USB keyboard, and for example, the USB-host interface 118 acquires update data including a desired version of firmware from the USB memory.

The network interface 119 performs data communication with an external apparatus, such as the PC 102 and a server apparatus 103, connected to a LAN 101. For example, the network interface 119 acquires print data from the PC 102, and further, acquires update data including a desired version of firmware from the server apparatus 103.

The console unit 130, the scanner unit 150, the FAX unit 160, and the finisher unit 170 are configured to be removably mounted. For example, the console unit 130, the scanner unit 150, the FAX unit 160, and the finisher unit 170 are retrofitted as additional options, and further, each of these components is replaced by a new component when it becomes faulty. The console unit 130, the printer unit 140, the scanner unit 150, the FAX unit 160, and the finisher unit 170 include CPUs 131, 141, 151, 161, and 171, and ROMs 132, 142, 152, 162, and 172, respectively. The CPUs 131, 141, 151, 161, and 171 execute firmware stored in the ROMs 132, 142, 152, 162, and 172, respectively. With this, the console unit 130, the printer unit 140, the scanner unit 150, the FAX unit 160, and the finisher unit 170 perform respective associated processing operations. Note that in the present embodiment, when updating the firmware of the MFP 100, not only the firmware stored in the ROM 112, but also items of firmware, stored in the ROMs 132, 142, 152, 162, and 172, are updated at the same time.

The console unit 130 includes a liquid crystal display section having a touch panel function, and a keyboard. For example, the console unit 130 receives information input by a user's operation, and displays a setting screen of the MFP 100 on the display section. The printer unit 140 performs printing on a sheet based on image data received from the printer interface 116 and the like. The finisher unit 170 performs finishing processing, such as stapling, punching, saddle-stitching bookbinding, and trimming, on printed sheets. The scanner unit 150 reads an original placed on an original platen glass, not shown, and generates image data. The FAX unit 160 performs FAX communication with an external apparatus connected via a FAX line 105, and for example, the FAX unit 160 transmits image data received via the USB-host interface 118 to the external apparatus by FAX.

Figure 2:
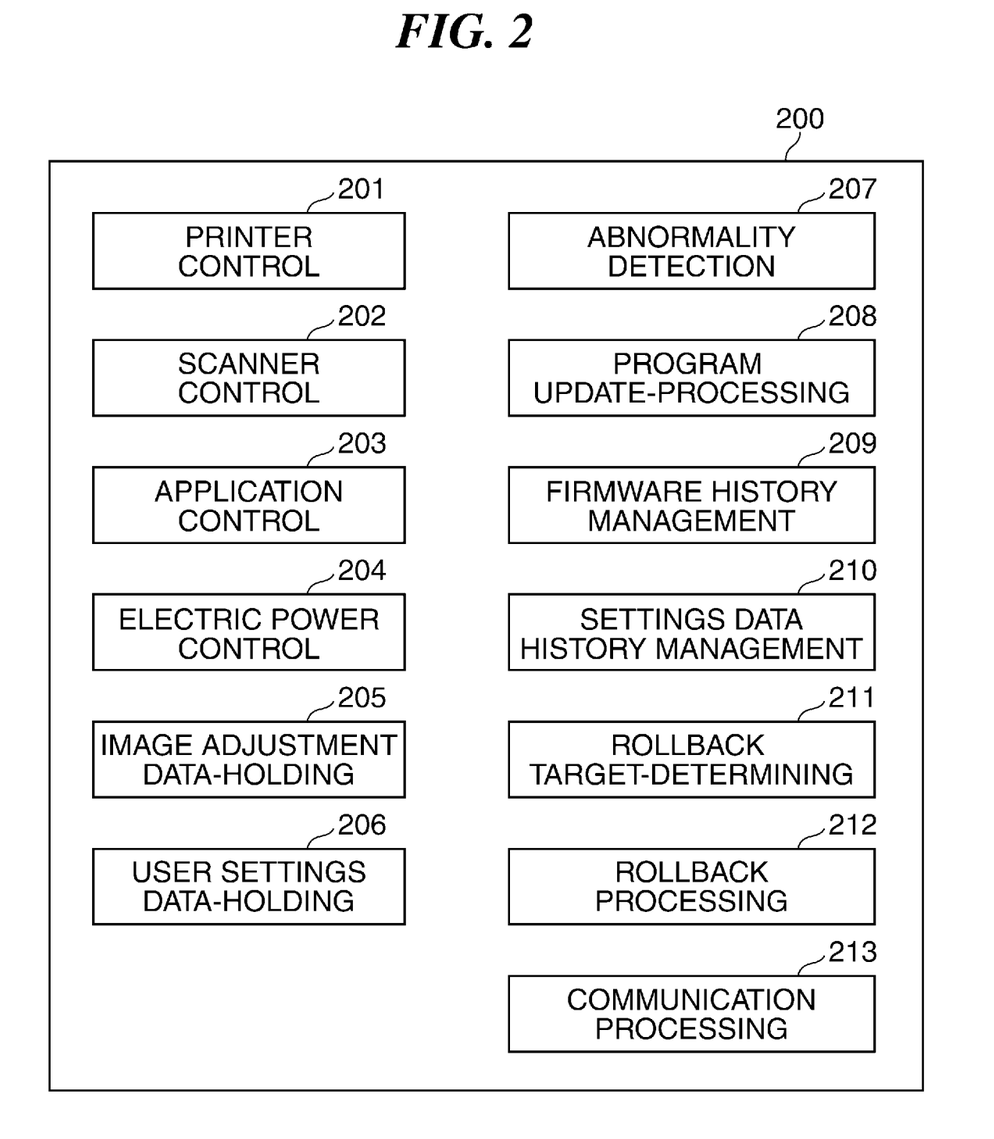
FIG. 2 is a schematic block diagram of a main system module of the MFP shown in FIG. 1.

FIG. 2 is a schematic block diagram of the main system module 200 of the MFP 100 shown in FIG. 1.

Referring to FIG. 2, the main system module 200 includes a printer control module 201, a scanner control module 202, an application control module 203, and an electric power control module 204. The main system module 200 also includes an image adjustment data-holding module 205, a user settings data-holding module 206, an abnormality detection module 207, a program update-processing module 208, and a firmware history management module 209. The main system module 200 further includes a settings data history management module 210, a rollback target-determining module 211, a rollback processing module 212, and a communication processing module 213. The processing operations of the main system module 200 are performed by the CPU 111 executing respective associated programs stored in the ROM 112.

The printer control module 201 controls the printer unit 140, and the scanner control module 202 controls the scanner unit 150. The application control module 203 is equipped with httpd (Hyper Text Transfer Protocol Daemon, lpd (Line Printer Daemon), a Web browser function, a device information distribution function, and so forth. The electric power control module 204 controls power supply to the MFP 100. The image adjustment data-holding module 205 holds image adjustment data used for image formation processing performed by the MFP 100. The image adjustment data refers to settings of margins, correction values of gradation and density of an image, color misregistration correction values, and so forth, which are set for print processing. The image adjustment data is adjusted such that the mentioned values become appropriate, according to a hardware individual difference, a change in operating environment, and so forth of the MFP 100.

The user settings data-holding module 206 holds user settings data. The user settings data refers to values of network settings, security settings, electric power control settings, default settings of copy and print processing, custom settings of each of a plurality of users, set by a personalizing function of the MFP 100, and so forth. The user settings data is updated according to a setting change instruction provided by a user, and is periodically backed up. The abnormality detection module 207 detects an abnormality of the system of the MFP 100. For example, when a failure of a storage device, such as the ROM 112 and the HDD 114, a failure in communication between the main controller 110 and the printer unit 140, a start-up failure of the main controller 110, or the like, occurs, the abnormality detection module 207 detects an abnormality of the system of the MFP 100.

The program update-processing module 208 updates firmware stored in each of the ROMs 112, 132, 142, 152, 162, and 172. The firmware history management module 209 manages the history information of the firmware updated by the program update-processing module 208, using firmware management information 300, described hereinafter with reference to FIG. 3A. The settings data history management module 210 perform processing for backing up the data items held by the image adjustment data-holding module 205 and the user settings data-holding module 206. Further, the settings data history management module 210 manages the history information of each of the data items, using image adjustment data management information 307 described hereinafter with reference to FIG. 3B, and user settings data management information 312 described hereinafter with reference to FIG. 3C.

The rollback target-determining module 211 determines, out of the firmware, the image adjustment data, and the user settings data, a type of target on which rollback processing is to be executed (hereinafter referred to as the "rollback target type"), based on a type of a rollback trigger 401, described hereinafter with reference to FIG. 4. The rollback processing module 212 performs rollback processing on the firmware, the image adjustment data, and the user settings data. The communication processing module 213 controls data communication with an external apparatus connected via the network interface 119.

Figure 3A:
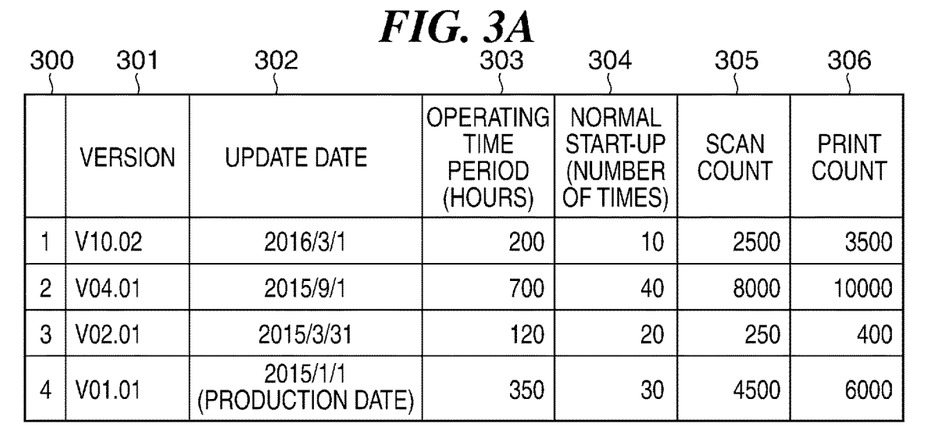
FIGS. 3A to 3C are diagrams each showing an example of management information managed by the MFP.
Figure 3B:
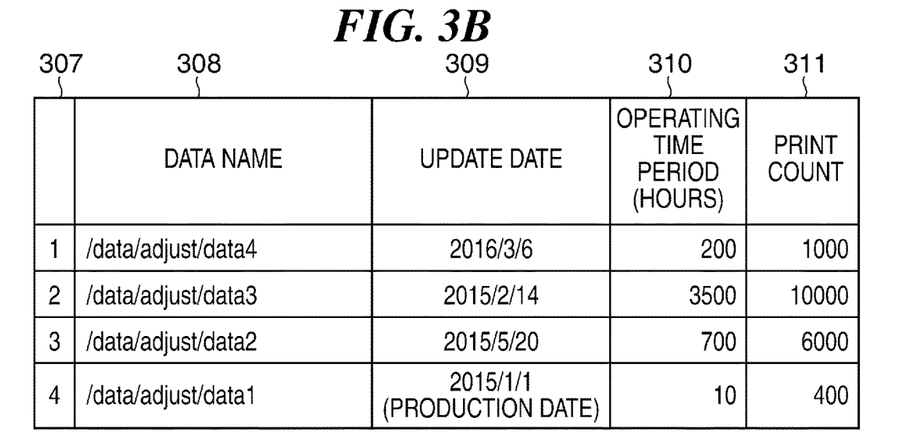
Figure 3C:
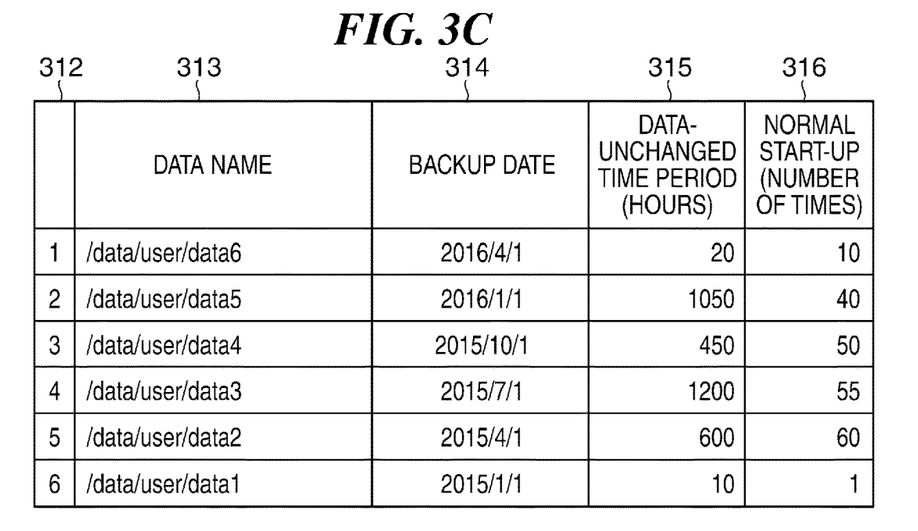

FIGS. 3A to 3C are diagrams each showing an example of the management information managed by the MFP 100 shown in FIG. 1. FIG. 3A shows the firmware management information 300, FIG. 3B shows the image adjustment data management information 307, and FIG. 3C shows the user settings data management information 312.

Referring to FIG. 3A, the firmware management information 300 manages the history information of the firmware of the MFP 100 from the time of factory production of the MFP 100 to the present time. In the firmware management information 300, information for identifying firmware installed when the MFP was produced in the factory is set as an initial value in advance, and whenever the firmware of the MFP 100 is updated, information for identifying new firmware (new version of the firmware) is added to the firmware management information 300. The firmware management information 300 includes information items of a version 301, an update date 302, operating time 303, a normal start-up 304, a scan count 305, and a print count 306. The version 301 indicates a version of firmware installed in the MFP 100, and the update date 302 indicates a date on which the version of the firmware was installed in the MFP 100. The operating time 303 indicates a time period over which the MFP 100 was operated with the firmware of the MFP 100 until the firmware was updated to a new version. The normal start-up 304 indicates the number of times of the normal start-up of the MFP 100, which was counted for the firmware until it was updated to the new version. The scan count 305 indicates the number of times of execution of scan processing performed by the MFP 100, which was counted for the firmware until it was updated to the new version. The print count 306 indicates the number of sheets printed by the MFP 100, which was counted for the firmware until it was updated to the new version.

In the present embodiment, firmware is relatively large in data amount, and hence when a new version of firmware is installed, the MFP 100 discards the current version of firmware, which has been used till then. That is, the MFP 100 does not hold the versions of firmware, which were used in the past, and manages the version information for identifying the version of the firmware, using the firmware management information 300. This enables the MFP 100 to easily acquire a past version of firmware e.g. from the server apparatus 103, without holding the past version of firmware, which causes reduction of the available storage capacity of the MFP 100.

Referring to FIG. 3B, the image adjustment data management information 307 manages the history information of the image adjustment data from the time of factory production of the MFP 100 to the present time. In the image adjustment data management information 307, information for identifying image adjustment data set when the MFP was produced at the factory is set as initial values in advance, and whenever the image adjustment data of the MFP 100 is updated to adjusted image adjustment data, information for identifying the adjusted image adjustment data is added to the image adjustment data management information 307. The image adjustment data management information 307 includes information items of a data name 308, an update date 309, operating time 310, and a print count 311. The data name 308 indicates a storage location of image adjustment data and a data name that identifies the image adjustment data. The update date 309 indicates a date on which the image adjustment data of the MFP 100 was updated to adjusted image adjustment data. The operating time period 310 indicates a time period over which the MFP 100 was operated using the adjustment data until it was updated to the adjusted image adjustment data. The print count 311 indicates the number of sheets printed by the MFP 100, which was counted for the adjustment data until it was updated to the adjusted image adjustment data.

Referring to FIG. 3C, the user settings data management information 312 manages the history information of the user settings data from the time of factory production of the MFP 100 to the present time. In the user settings data management information 312, information for identifying user settings data set when the MFP was produced in the factory is set as initial values in advance, and whenever the user settings data is updated to user settings data changed by a user, information for identifying the changed user settings data is added to the user settings data management information 312. The user settings data management information 312 includes information items of a data name 313, a backup date 314, a data-unchanged time period 315, and a normal start-up 316. The data name 313 indicates a storage location of user settings data and a data name that identifies the user settings data. The backup date 314 indicates a date on which the user settings data was backed up. The data-unchanged time period 315 indicates a time period over which the user settings data was used until it was updated to new contents. The normal start-up 316 indicates the number of times of the normal start-up of the MFP 100 which was counted for the user settings data indicated by the data name 313 until it was updated to the new contents. Note that in the present embodiment, the image adjustment data and the user settings data are relatively small in data amount, and hence the MFP 100 holds all of the image adjustment data and the user settings data, which were set in the past, in the ROM 112 and the HDD 114. This enables the MFP 100 to easily set the image adjustment data and the user settings data to data set in the past again.

In the present embodiment, when an abnormality of the system of the MFP 100 is detected, or when an instruction for executing rollback processing is received from a user, the MFP 100 determines a rollback target type, and performs rollback processing associated with the determined rollback target type. The rollback target type is determined out of the firmware, the image adjustment data, and the user settings data, based on conditions set in a data identification management table 400, shown in FIG. 4.

Figure 4:
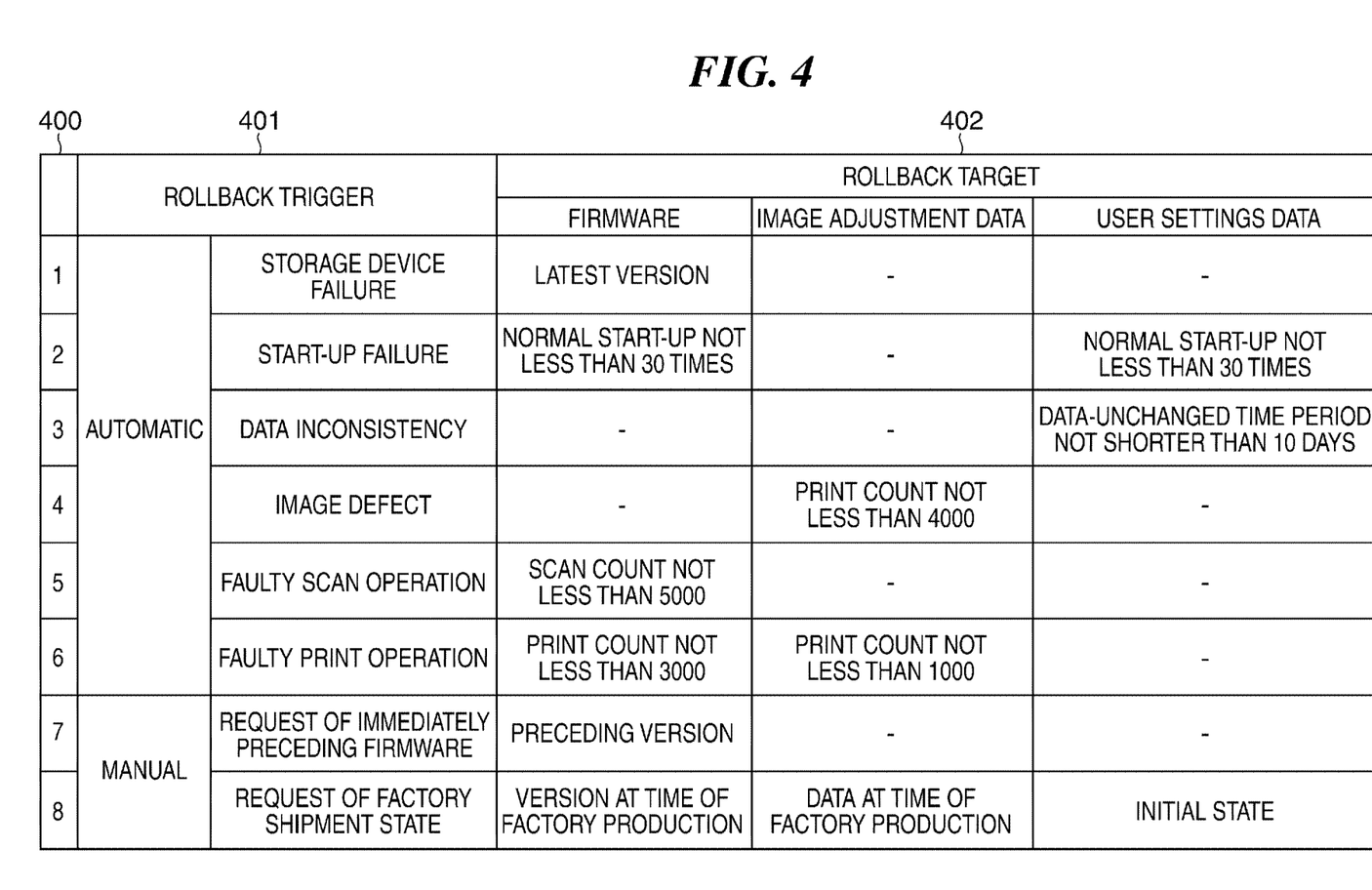
FIG. 4 is a diagram showing an example of a data identification management table used by the MFP.

Referring to FIG. 4, the data identification management table 400 includes information items of the rollback trigger 401 and a rollback target 402. In the rollback trigger 401, there are set conditions for determining a rollback target type, which are classified into abnormality detection (automatic execution) and user request (manual execution). The conditions of the abnormality detection include, as indicated by item numbers 1 to 6 in FIG. 4, "storage device failure", "start-up failure", "data inconsistency", "image defect", "faulty scan operation", and "faulty print operation". The user request includes, as indicated by item numbers 7 and 8 in FIG. 4, "request of immediately preceding version of firmware" and "request of firmware in the factory shipment state". As the rollback target 402, there is set, in association with each condition of the rollback trigger 401, information indicative of the rollback target type, more specifically, information indicative of at least one of the firmware, the image adjustment data, and the user settings data. Further, as the rollback target 402, there are set, in association with each rollback target type, conditions for determining what version of data is to replace the data as the target of rollback processing.

For example, if the "storage device failure" is detected as an abnormality of the system of the MFP 100, there is a high possibility that the firmware in the ROM 112 is broken. In this case, the MFP 100 performs rollback processing for updating the firmware of the MFP 100 to the latest version thereof based on the data identification management table 400. Note that in the present embodiment, the setting contents in the data identification management table 400 may be set for each product based on the productivity and characteristics of the MFP 100 in advance, or may be set by a service person or a user as desired.

Next, a description will be given of the rollback processing performed by the MFP 100.

Figure 5:
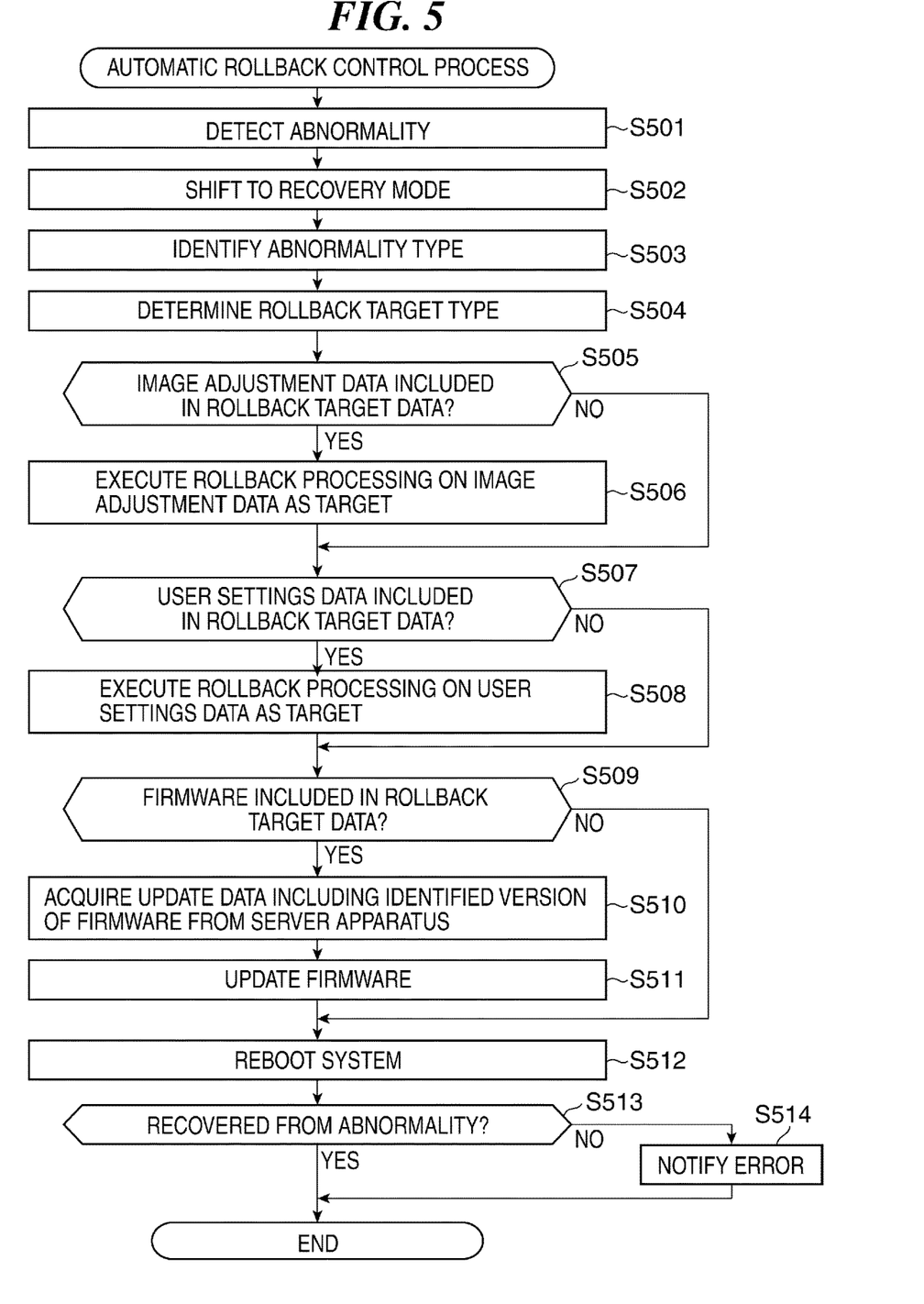
FIG. 5 is a flowchart of an automatic rollback control process performed by the MFP.

FIG. 5 is a flowchart of an automatic rollback control process which is performed by the MFP 100 shown in FIG. 1.

The automatic rollback control process in FIG. 5 is performed by the CPU 111 executing an associated program stored in the ROM 112 when the CPU 111 detects an abnormality of the system of the MFP 100. Note that the firmware, the image adjustment data, and the user settings data, in use when execution of the automatic rollback control process in FIG. 5 is started, are referred to as the current firmware, the current image adjustment data, and the current user settings data.

Referring to FIG. 5, first, the CPU 111 detects an abnormality of the system of the MFP 100 (step S501), causes the MFP 100 to shift to a recovery mode (step S502), and identifies the type of the abnormality of the system of the MFP 100 (step S503). In the step S503, for example, one of "storage device failure", "start-up failure", "data inconsistency", "image defect", "faulty scan operation", and "faulty print operation", indicated by the item numbers 1 to 6 in FIG. 4, is identified. Then, the CPU 111 determines the rollback target type based on the identified abnormality type (step S504). In the step S504, the CPU 111 determines at least one of the firmware, the image adjustment data, and the user settings data, as the rollback target type, based on the data identification management table 400. Then, the CPU 111 determines whether or not the image adjustment data is included in the rollback target type (step S505).

If it is determined in the step S505 that the image adjustment data is not included, the CPU 111 proceeds to a step S507, described hereinafter. On the other hand, if it is determined in the step S505 that the image adjustment data is included, the CPU 111 identifies, out of the image adjustment data items managed by the image adjustment data management information 307, the image adjustment data corresponding to the condition of the rollback target 402 in the data identification management table 400. For example, if the type of the detected abnormality of the system of the MFP 100 is "image defect", the CPU 111 identifies, out of the data items in the image adjustment data management information 307 except the current image adjustment data, the latest image adjustment data "data 3" as satisfying the condition that the print count is not less than 4000. Then, the CPU 111 acquires the identified image adjustment data (e.g. "data 3") from the ROM 112 or the like, and executes rollback processing on the target image adjustment data (step S506). As a result, the current image adjustment data is replaced by the acquired image adjustment data (e.g. "data 3"). Then, the CPU 111 determines whether or not the user settings data is included in the rollback target type (step S507).

If it is determined in the step S507 that the user settings data is not included in the rollback target type, the CPU 111 proceeds to a step S509, described hereinafter. On the other hand, if it is determined in the step S507 that the user settings data is included in the rollback target type, the CPU 111 identifies, out of the user settings data items managed by the user settings data management information 312, the user settings data corresponding to the condition of the rollback target 402. For example, if the type of the detected abnormality of the system of the MFP 100 is "start-up failure", the CPU 111 identifies, out of the data items in the user settings data management information 312 except the current user settings data, the latest user settings data "data 5" as satisfying the condition that the number of times of the normal start-up is not less than 30. Then, the CPU 111 acquires the identified user settings data (e.g. "data 5") from the ROM 112 or the like, and executes rollback processing on the target user settings data (step S508). As a result, the current user settings data is replaced by the acquired user settings data (e.g. "data 5"). Then, the CPU 111 determines whether or not the firmware is included in the rollback target type (step S509).

If it is determined in the step S509 that the firmware is not included, the CPU 111 proceeds to a step S512, described hereinafter. On the other hand, if it is determined in the step S509 that the firmware is included in the rollback target type, the CPU 111 identifies, out of the firmware items managed by the firmware management information 300, the version of firmware corresponding to the condition of the rollback target 402. For example, if the type of the detected abnormality of the system of the MFP 100 is "faulty scan operation", the CPU 111 identifies, out of the firmware items in the firmware management information 300 except the current firmware, the latest version of the firmware "V04. 01" as satisfying the condition that the scan count is not less than 5000. Then, the CPU 111 acquires update data including the identified version of firmware (e.g. "V04. 01") e.g. from the server apparatus 103 (step S510), and updates the firmware (step S511). As a result, the current firmware is replaced by the firmware of the acquired update data (e.g. "V04. 01"). Then, the CPU 111 performs system reboot processing (step S512), and determines whether or not the system of the MFP 100 has been recovered from the abnormality (step S513).

If it is determined in the step S513 that the system of the MFP 100 has been recovered from the abnormality, the CPU 111 terminates the present process. On the other hand, if it is determined in the step S513 that the system of the MFP 100 has not been recovered from the abnormality, the CPU 111 sends an error notification (step S514). For example, the CPU 111 displays e.g. an alarm or a warning on the console unit 130, and if support by a service person is needed, the CPU 111 notifies the server apparatus 103 of the error. After that, the CPU 111 terminates the present process.

According to the above-described automatic rollback control process in FIG. 5, rollback processing on the system of the MFP 100 is performed based on the history information (the firmware management information 300, the image adjustment data management information 307, and the user settings data management information 312) of the data set in the past. This makes it possible to easily roll back the data to desired data set in the MFP 100 in the past, and further, it is possible to automatically roll back the system of the MFP 100 to an appropriate state.

Further, in the automatic rollback control process in FIG. 5, the rollback target type is at least one of the firmware, the image adjustment data, and the user settings data. This makes it possible to easily roll back the current firmware, the current image adjustment data, and the current user settings data, to desired data set in the past.

Further, in the automatic rollback control process in FIG. 5, the rollback target type is determined out of the firmware, the image adjustment data, and the user settings data, according to the type of an abnormality of the system of the MFP 100. This makes it possible to perform rollback processing on data which is required to be rolled back so as to recover the system of the MFP 100 from the abnormality, and further, it is possible to properly recover the system of the MFP 100 from the abnormality.

In the automatic rollback control process in FIG. 5, each data of the rollback target type determined according to the type of an abnormality of the system of the MFP 100 is replaced by the latest data satisfying the condition, such as the number of execution times (not less than a predetermined threshold value), set for the rollback target type 402. That is, when an abnormality of the system of the MFP 100 is detected, the data is replaced by the past data having an operation record which is not lower than a predetermined threshold value. This makes it possible to more properly recover, when an abnormality of the system of the MFP 100 is detected, the system of the MFP 100 from the abnormality.

Next, a description will be given of the rollback processing performed by the MFP 100 when an execution instruction is received from a user.

Figure 6:
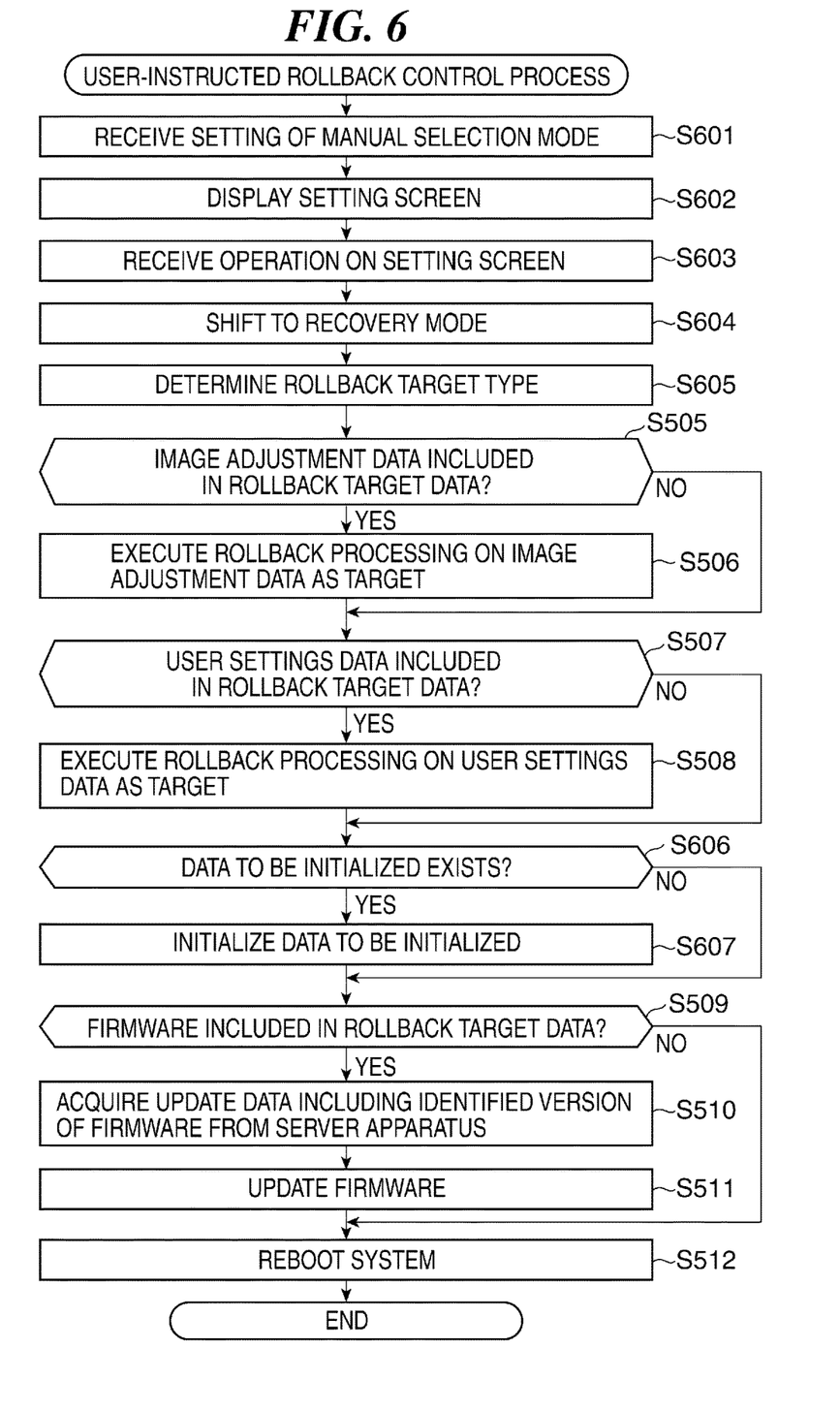
FIG. 6 is a flowchart of a user-instructed rollback control process performed by the MFP.

FIG. 6 is a flowchart of a user-instructed rollback control process performed by the MFP 100 shown in FIG. 1.

The user-instructed rollback control process in FIG. 6 is performed by the CPU 111 executing an associated program stored in the ROM 112 when a manual selection mode is set in which the MFP 100 receives an instruction for executing rollback processing from a user. Note that the firmware, the image adjustment data, and the user settings data, in use when execution of the user-instructed rollback control process in FIG. 6 is started, are referred to as the current firmware, the current image adjustment data, and the current user settings data. Further, steps in which the same processing as performed in corresponding steps of the automatic rollback control process in FIG. 5 is performed are denoted by the same step numbers and description thereof is omitted.

Figure 7:
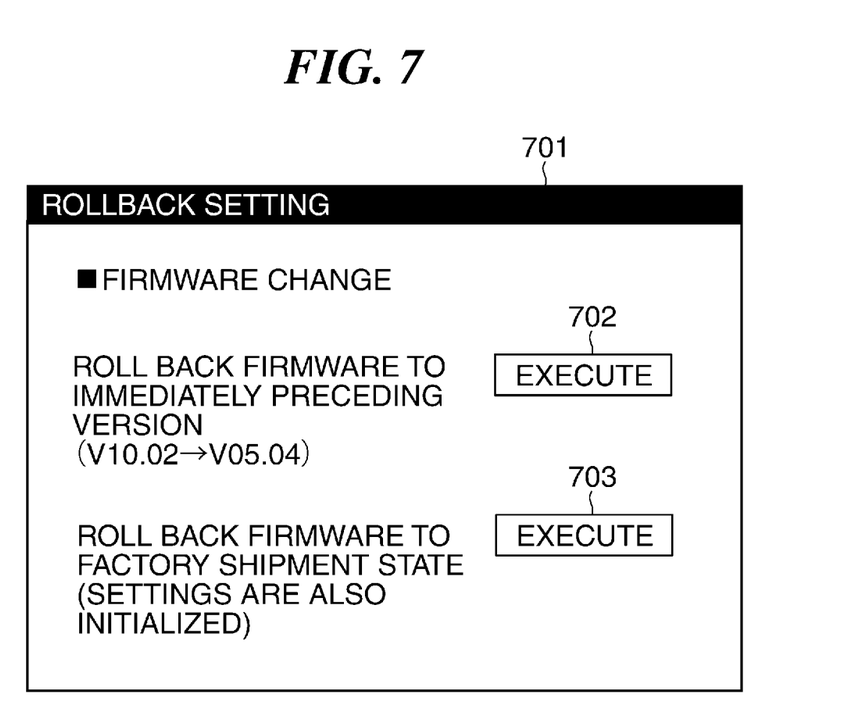
FIG. 7 is a diagram showing an example of a setting screen displayed on a console unit appearing in FIG. 1.

Referring to FIG. 6, first, the CPU 111 receives the setting of the manual selection mode (step S601), and displays a setting screen 701, shown in FIG. 7, on the console unit 130 (step S602). The setting screen 701 includes setting buttons 702 and 703. The setting button 702 is an operation button for inputting an instruction for rolling back the current firmware to the immediately preceding version of firmware. The setting button 703 is an operation button for inputting an instruction for rolling back the current firmware to the version at the time of factory shipment. When the setting screen 701 is displayed on the console unit 130, the user can select one of the setting buttons 702 and 703.

Then, the CPU 111 receives the operation performed on the setting screen 701 (step S603), and causes the MFP 100 to shift to the recovery mode (step S604). Then, the CPU 111 determines the rollback target type based on the setting button selected by the user on the setting screen 701 (step S605). Then, the CPU 111 executes the steps S505 to S508. Then, the CPU 111 determines whether or not there is data to be initialized (step S606).

If it is determined in the step S606 that there is no data to be initialized, the CPU 111 executes the steps S509 to S512, followed by terminating the present process. On the other hand, if it is determined in the step S606 that there is data to be initialized, the CPU 111 initializes the data to be initialized (step S607), and executes the steps S590 to S512. For example, if the setting button 703 is selected on the setting screen 701, the CPU 111 performs rollback processing on the target image adjustment data to thereby replace the current image adjustment data by the image adjustment data set at the time of factory shipment in the step S506. Further, the CPU 111 initializes the current user settings data in the step S607, and performs processing for updating the firmware in the step S511 to thereby replace the current firmware with the version of the firmware at the time of factory shipment. Although in the present embodiment, the current user settings data may be replaced by the user settings data set at the time of factory shipment, without initializing the data, since the initial values are set as the user settings data at the time of factory shipment, substantially the same results are obtained as obtained when the user settings data is initialized. After that, the CPU 111 terminates the present process.

In the above-described user-instructed rollback control process in FIG. 6, the firmware management information 300, the image adjustment data management information 307, and the user settings data management information 312 include information for identifying the firmware, the image adjustment data, and the user settings data, which were installed in the MFP 100 before factory shipment, respectively. This makes it possible to easily roll back the system of the MFP 100 to the state at the time of factory shipment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-052510 filed Mar. 17, 2017, which is hereby incorporated by reference herein in its entirety.

What is claimed is:

1. An image forming apparatus, comprising:
    a storage control unit configured to store an update history of version of firmware stored in a storage of the image forming apparatus and an update history of image adjustment value used for printing of an image by the image forming apparatus, in the storage;
    a detection unit configured to detect a failure which occurs when a scan or a print is performed in the image forming apparatus;
        a determination unit configured to determine, in accordance with a type of the failure detected by the detection unit, a version of firmware included in the update history of version of firmware and an image adjustment value included in the update history of image adjustment value; and
        a replacing unit configured to replace a version of firmware by the version of firmware determined by the determination unit and replace an image adjustment value by the image adjustment value determined by the determination unit.

2. The image forming apparatus according to claim 1, wherein the failure is of least one of a start-up failure, an image printing defect, a fault of a scan operation, or a fault of a print operation, of the image forming apparatus.

3. The image forming apparatus according to claim 1, wherein the update history of version of firmware includes at least an update date of the firmware or the number of times the image forming apparatus normally started up by using the firmware.

4. The image forming apparatus according to claim 1, wherein the update history of version of firmware includes at least a count of the scan or a count of the print performed by the image forming apparatus by using the firmware.

5. The image forming apparatus according to claim 1, wherein the update history of image adjustment value used for printing of an image by the image forming apparatus includes a print count which indicates the number of times of printing performed by the image forming apparatus by using the image adjustment value.

6. The image forming apparatus according to claim 1, wherein in a case where the failure type detected by the detection unit is a start-up failure of the image forming apparatus, the determination unit determines the version of the firmware to be a version of a firmware of which the number of times of normal start-up is a predetermined value or more.

7. The image forming apparatus according to claim 1, wherein in a case where the failure type detected by the detection unit is a fault of the print operation of the image forming apparatus, the determination unit determines the version of the firmware to be a version of a firmware of which print count is a predetermined value or more.

8. The image forming apparatus according to claim 1, wherein in a case where the failure type detected by the detection unit is a fault of the print operation of the image forming apparatus, the determination unit determines the image adjustment value to be an image adjustment value of which print count is a predetermined value or more.

9. A method of controlling an image forming apparatus, the method comprising:
    storing an update history of version of firmware stored in a storage of the image forming apparatus and an update history of image adjustment value used for printing of an image by the image forming apparatus, in the storage;
    detecting a failure which occurs when a scan or a print is performed in the image forming apparatus;
        determining, in accordance with a type of the detected failure, a version of firmware included in the update history of version of firmware and an image adjustment value included in the update history of image adjustment value; and
        replacing a version of firmware by the determined version of firmware and replace an image adjustment value by the determined image adjustment value.

10. The method according to claim 9, wherein the failure is at least one of a start-up failure, an image printing defect, a fault of a scan operation, or a fault of a print operation, of the image forming apparatus.

11. The method according to claim 9, wherein the update history of version of firmware includes at least an update date of the firmware or the number of times the image forming apparatus normally started up by using the firmware.

12. The method according to claim 9, wherein the update history of version of firmware includes at least a count of the scan or a count of the print performed by the image forming apparatus by using the firmware.

13. The method according to claim 9, wherein the update history of image adjustment value used for printing of an image by the image forming apparatus includes a print count which indicates the number of times of printing performed by the image forming apparatus by using the image adjustment value.

14. The method according to claim 9, wherein in a case where the detected failure type is a start-up failure of the image forming apparatus, the version of the firmware is determined to be a version of a firmware of which the number of times of normal start-up is a predetermined value or more.

15. The method according to claim 9, wherein in a case where the detected failure type is a fault of the print operation of the image forming apparatus, the version of the firmware is determined to be a version of a firmware of which print count is a predetermined value or more.

16. The method according to claim 9, wherein in a case where the failure type detected by the detection unit is a fault of the print operation of the image forming apparatus, the image adjustment value is determined to be an image adjustment value of which print count is a predetermined value or more.

* * * * *